Dec. 13, 1927. 1,652,917

T. UMEZAWA

ELECTRIC MEASURING APPARATUS

Filed July 3, 1922

TERMINALS FOR POTETIALS & TEMPERATURE MEASUREMENTS

TERMINALS FOR TEMPERATURE MEASUREMENTS.

Inventor:
Tsutomu Umezawa,
by Albert S. Davis
His Attorney.

Patented Dec. 13, 1927.

1,652,917

UNITED STATES PATENT OFFICE.

TSUTOMU UMEZAWA, OF TOKYO, JAPAN, ASSIGNOR TO GENERAL ELECTRIC COMPANY, A CORPORATION OF NEW YORK.

ELECTRIC MEASURING APPARATUS.

Application filed July 3, 1922, Serial No. 572,718, and in Japan September 14, 1921.

My invention relates to electric measuring apparatus and more particularly to an electric measuring instrument arranged to serve for a plurality of uses.

Although my invention is applicable for various uses, its primary object is to provide a simple and convenient instrument for measuring temperatures by what is known as the exploring coil method. By exploring coil method I mean the method of measuring temperatures by measuring the resistances of a coil or conductor having a known temperature coefficient which coil is exposed to the temperature to be measured. Thus oftentimes the temperature of electrical apparatus is determined by measuring the resistance of a coil or coils embedded therein and indicating the result on an electrical instrument calibrated to read directly in temperature units. In such method it is desirable and often necessary to subject the exploring coil to the same voltage or current each time a reading is taken. Thus, ordinarily, two electrical instruments are necessary, one for measuring the current or voltage to which the exploring coil is subjected and the other for measuring or indicating in some form the change in resistance. My invention combines the necessary measuring instruments into one and is illustrated and explained as an instrument having two opposing potential coils, one of which is used for measuring potentials and both of which are used in a differential manner for measuring temperatures. Other advantages of my invention will be pointed out as the description proceeds.

Figure 1:
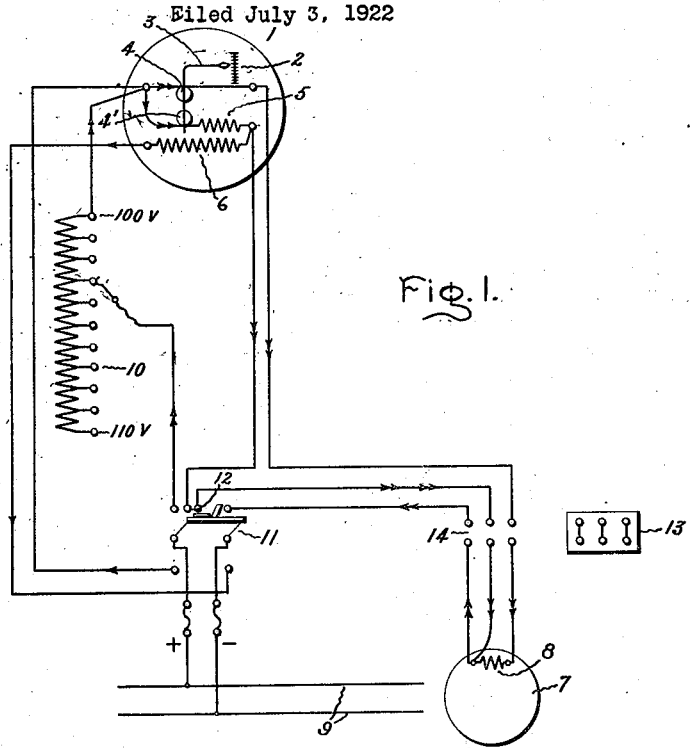
Figure 2:
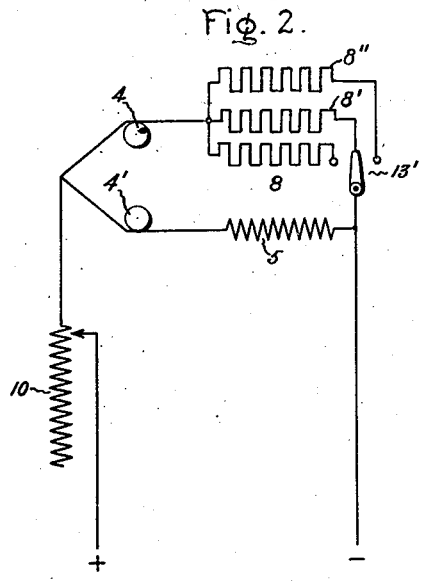

The features of my invention which I believe to be novel and patentable will be pointed out in the claims appended hereto. The details of construction and theory of operation of my improved measuring apparatus will now be explained in connection with the accompanying drawings in which Fig. 1 illustrates the electrical connections of a combined voltmeter and thermometer when connected for use; Fig. 2 illustrates a modified connection diagram for my improved instrument and Fig. 3 is a perspective view showing the essential parts of the instrument.

Figure 3:
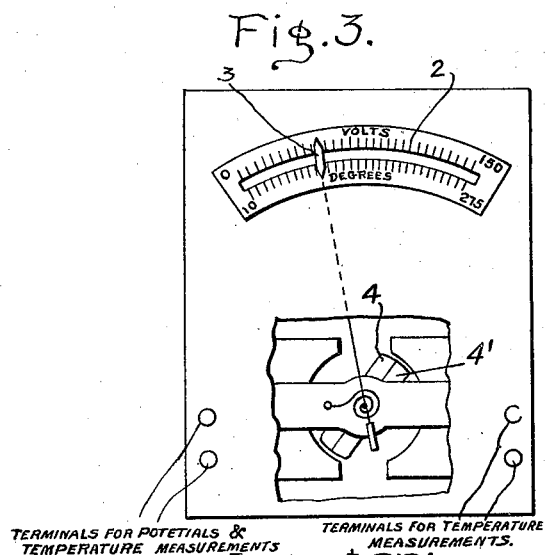

Referring now to the drawings, in which like parts are designated by like numerals throughout, 1 indicates a combination voltmeter and electric thermometer having scales 2 for indicating both the voltage and the temperature by means of a single pointer 3, the two scales being arranged as shown in Fig. 3. The pointer 3 is connected to two moving coils 4 and 4' which coils are connected in opposition. A resistance 5 is connected in series with coil 4' as is also a resistance 6 when the instrument is to be used for measuring voltages. The two resistances 5 and 6 will have temperature coefficients equal to or substantially equal to zero. The construction of the apparatus is not restricted to having both of the coils 4 and 4' movable but may have one of the coils stationary and the other movable as in a dynamometer. 7 indicates the body of an electrical or other machine, the temperature of which it is desired to determine. Embedded in the machine 7 is an exploring coil 8 having a known temperature coefficient. A source of potential 9 is provided for furnishing the measuring current and an adjustable resistance 10 for obtaining the correct voltage. A double throw switch 11 having its middle points connected to the source 9 is adapted, when thrown to the upper contacts, to connect the source 9 in series with resistance 10, coil 4 of instrument 1 and the exploring coil 8. In the upper position of switch 11 an auxiliary contact 12 thereon cooperates with stationary contacts to close a circuit connected between resistances 5 and 6 of instrument 1 and the line side of exploring coil 8. Preferably a three-pole plug switch 13 operating with plug socket 14 is provided for disconnecting the resistance coil 8 from the rest of the apparatus. Where a plurality of exploring coils are provided the plug switch 13 may be arranged to connect any particular coil to the measuring instrument in a well understood manner. When the switch 11 is thrown down it connects the source 9 across the voltage measuring coil 4' and resistances 5 and 6 of the instrument 1. The direction of current through the various circuits with the switch 11 down is indicated by the single arrows and with the switch 11 up by the double arrows. The instrument will be carefully calibrated with the resistance 8 of the exploring coil and the adjustable resistance 10 will be graduated before hand so that by adjusting the resistance thereof the correct voltage for using the instrument as an electric thermometer may be obtained for different voltages of the source 9. Preferably one of the scales 2 shown in Fig. 3 will be calibrated with the potential circuit of the instrument to read voltage and the other scale will be calibrated with the temperature measuring circuit to read temperatures.

With the apparatus properly calibrated the temperature of machine 8 may be determined as follows: Switch 11 will be thrown down to determine the voltage of the source 9 which will be indicated on the voltage scale of the instrument 1. Let us suppose for example that the indicated voltage is 103 and that the temperature measuring circuit is calibrated to be used with 100 volts. The resistance 10 will be adjusted to the proper indication thereon to give 100 volts across the temperature measuring circuit when the switch 11 is thrown up. When this has been done and the plug switch 13 inserted in plug sockets 14 the temperature of the exploring coil 8 will be indicated on the temperature graduated scale of instrument 1. After noting the temperature indication the voltage may be checked by again throwing switch 11 to its lower position.

It will thus be seen that accurate temperature measurements may be quickly obtained by such an instrument even though the voltage of source 9 is rather unsteady. The operator has only one instrument to watch which instrument may be easily carried about. Any conditions which might cause slight errors in instrument indications will have the same effect whether the instrument is used as a voltmeter or electric thermometer and such errors are therefore automatically compensated for to a certain extent.

When the instrument is used as a voltmeter the potential coil 4' operates as in an ordinary moving coil voltmeter. When used as an electric thermometer current will flow through both coils 4 and 4' causing opposing torques. Since the current in the two circuits divides inversely proportional to the respective resistances of those circuits the instrument will read 0 when the constant resistance 5 and the temperature responsive exploring coil resistance 8 have equal values. It will be understood that these two resistances are selected to be equal to each other at a definite predetermined temperature which temperature corresponds to the 0 deflection. Now as the temperature of coil 8 increases the current in coil 4 decreases and the balanced condition is thereby destroyed causing pointer 3 to be deflected to a position corresponding to the difference between the current flowing through coils 4 and 4' which position will be an indication of the temperature rise of coil 8 and is marked accordingly. The constant resistance 6 is preferably included in the voltage measuring circuit so as to make the instrument equally sensitive when used for the different purposes.

In Fig. 2 I have illustrated a simplified method of connecting my improved instrument in circuit, the corresponding parts being identified by the same reference numerals as in Fig. 1, 8, 8' and 8'' indicate exploring coils in different locations of a machine or in different machines, a switch 13' may connect any one of these coils in circuit for the purpose of measuring the temperature thereof in the manner previously explained. When switch 13' is open the instrument is connected as a voltmeter with only coil 4' and resistance 5 in circuit. When so used the resistance 10 should be short circuited.

A meter built in this manner may serve as the station voltmeter for exciter circuits and the like and the same instrument can be used to determine the hot spot temperature of any machine by merely adjusting the resistance 10 to the proper point and connecting the exploring coil for that machine in circuit by switch 13' using the exciter circuit as the source of measuring potential.

Although I have described my instrument as a combined voltmeter and electric thermometer, it will be obvious to those skilled in the art that it may be adapted for various other uses such, for example, as a double reading meter for various purposes.

What I claim as new and desire to secure by Letters Patent of the United States, is,—

1. An electric measuring instrument having a moving element with two coil sections, a pointer on said moving element, a scale with which said pointer cooperates, said scale being graduated in two different systems of units, connections for energizing one of said coil sections to produce a deflection of said pointer corresponding to one of said graduation systems, and connections for energizing both of said coil sections in opposition to produce a deflection of said pointer corresponding to the other of said systems.

2. An exploring coil and an electric temperature measuring and indicating instrument having two energizing windings designed to be used in conjunction with said exploring coil, one winding to carry the current of the exploring coil and the other winding to carry a current proportional to the drop in voltage of the exploring coil and indicating means inversely influenced by said windings calibrated to indicate the ratio of the current flowing in said windings in terms of the temperature of the exploring coil, said instrument also being designed and calibrated to be used as a voltmeter when one only of said windings is energized.

3. An electric measuring apparatus comprising an instrument of an indicating type having two energizing windings, a calibrating resistance for said instrument, an exploring coil, a source of supply, switching means for connecting one of said windings in series with said exploring coil and said source of supply and the other winding across said exploring coil in one position of said switching means and for connecting only one of said coils in series with said calibrating resistance to said source of supply in another position of said switching means, the instrument being designed and calibrated to indicate the temperature of the exploring coil in the first mentioned position of said switching means and to indicate the voltage of the source of supply in the second mentioned position of said switching means.

4. An electric measuring instrument having a moving element, a pointer on said moving element, a scale with which said pointer cooperates, said scale being graduated in two different systems of units, a torsional spring for controlling the movement of said moving element, two energizing windings for said instrument, connections for energizing only one of said windings for producing a deflection of said pointer corresponding to one of said graduation systems and connections for energizing both of said windings in opposition to produce a deflection of said pointer corresponding to the other graduation system.

5. In combination, an electric temperature indicating instrument of the type adapted to be used in connection with a source of potential for indicating the temperature of an exploring coil, a source of potential, a temperature responsive exploring coil, a variable resistance, a two-way switch, circuit connections between a portion of the exciting winding of said instrument and one side of said switch, circuit connections associating the resistance, all of the exciting winding of said instrument, and the exploring coil with the other side of said switch, circuit connections between said source and the middle points of said switch, said two-way switch being thus adapted in one position to connect a portion of the exciting winding of said instrument to said source of potential for measuring the same, and in the other position to connect all of the exciting winding of said instrument to the source of potential, variable resistance and exploring coil, in a manner to subject said coil and instrument to the correct potential for causing said instrument to indicate the temperature of said coil.

In witness whereof, I have hereunto set my hand this thirteenth (13th) day of June, 1922.

TSUTOMU UMEZAWA.